United States Patent [19]

Harreither

[11] Patent Number: 5,382,145
[45] Date of Patent: Jan. 17, 1995

[54] APPARATUS FOR THE APPORTIONED RELEASE OF FLOWABLE SUBSTANCES

[75] Inventor: Rupert Harreither, Baden, Austria

[73] Assignee: Berndorf Band Gesmbh, Berndorf, Austria

[21] Appl. No.: 112,521

[22] Filed: Aug. 27, 1993

[30] Foreign Application Priority Data

Aug. 28, 1992 [AT] Austria .................. 1730/92

[51] Int. Cl.$^6$ .................. B01J 4/02; B01J 2/20
[52] U.S. Cl. .................. 425/8; 264/8; 264/13; 425/365; 425/377; 425/378.1; 425/382 R; 425/382.3
[58] Field of Search ............ 425/6, 8, 381, 382 R, 425/382.3, 464, 447, 449, 377, 378.1, 365; 264/8, 13, 5

[56] References Cited

U.S. PATENT DOCUMENTS

| | | |
|---|---|---|
| 2,979,764 | 4/1961 | Andrews . |
| 3,208,101 | 9/1965 | Kaiser et al. . |
| 4,279,579 | 7/1981 | Froeschke .................. 425/6 |
| 4,397,628 | 8/1983 | Pints et al. .................. 425/382 R |
| 4,559,000 | 12/1985 | Froeschke .................. 425/381 |
| 4,563,315 | 1/1986 | Walter et al. .................. 264/13 |
| 4,610,615 | 9/1986 | Froeschke .................. 425/8 |
| 4,623,307 | 11/1986 | Fweischke .................. 425/382.3 |
| 5,013,498 | 5/1991 | Froeschke .................. 425/382.3 |
| 5,286,181 | 2/1994 | Schwager .................. 425/8 |

FOREIGN PATENT DOCUMENTS

| | | |
|---|---|---|
| 1238160 | 6/1988 | Canada . |
| 0012192 | 6/1980 | European Pat. Off. . |
| 0145839 | 6/1985 | European Pat. Off. . |
| 0166200 | 1/1986 | European Pat. Off. . |
| 0477164 | 3/1992 | European Pat. Off. . |
| 0511197 | 10/1992 | European Pat. Off. . |
| 4-64425 | 2/1992 | Japan .................. 425/381 |

*Primary Examiner*—Khanh Nguyen
*Attorney, Agent, or Firm*—Sandler Greenblum & Bernstein

[57] ABSTRACT

Apparatus for the apportioned release or metered dosing of flowable substances, including a distributor having a movable endless sleeve with a plurality of continuous openings for the passage of the substances, with the distributor having a distribution channel that is fed with these substances and has an inlet with a plurality of bores connected with an outwardly open recess that extends transversely to the direction of movement of the sleeve with the substances being deposited in portions or doses, via the recess, downwardly through openings in the sleeve, upon means for transporting, wherein within and along the distribution channel, a distribution conduit is arranged which includes an exit remote from the recess, with a flow of the substances occurring through the exit transversely to the distribution conduit.

38 Claims, 5 Drawing Sheets

5,382,145

APPARATUS FOR THE APPORTIONED RELEASE OF FLOWABLE SUBSTANCES

CROSS REFERENCE TO RELATED APPLICATIONS

This application claims the priority of Austrian Application No. A 1730/92, filed 28 Aug. 1992. This application is also related to allowed U.S. patent application Ser. No. 07/854,009, filed Mar. 19, 1992 now U.S. Pat. No. 5,332,378.

BACKGROUND OF THE INVENTION

1. Field of the Invention

This invention pertains to an apparatus for the apportioned release or metered dosing of flowable substances or masses with, in particular, a stationary distributor or drum member having, in cross section, at least a rounded outer region relative to which an endless sleeve is moveable.

2. Discussion of Background and Material Information

In the chemical industry, the food industry as well as other industrial fields, there is a need to apportion or meter flowable substances of differing viscosities, and as a rule subsequently solidifying these portions. With thermoplastic substances it is entirely sufficient to cool down fluid droplets, that is portions thereof, on, for example, a transport belt or band that is arranged below the apparatus. In the food industry it may well be desired to subsequently, for example, to subject these portions to a thermal treatment, such as in a baking oven.

Quite a few apparatuses, for the apportioned release or metered dosing of flowable substances, are known in the art. The operating principle of all these apparatuses is that the substances or masses are conveyed in a flowable state or kept in such a state and a flow stream thereof is interrupted. This interruption of the fluid stream can, for example, be accomplished in accordance with U.S. Pat. No. 3,208,101 in that a discontinuous fluid stream is produced via the use of a gear pump. After separation of the fluid stream into individual portions, these portions are received on a movable receiver area that is located underneath the substance exit or is received by other transport means, such as for example a gas stream, a fluidized bed or the like.

A further apparatus for the apportioning of flowable masses is described in U.S. Pat. No. 2,979,764 and utilizes a container which holds a flowable mass. This container, which is circular in cross section, includes a lower frontal area having a plurality of bores. Rotating within this container is a blade or impeller which alternately opens and closes the openings so that, depending upon the viscosity of the fluid and the rotational speed of the impeller, the amount or size of the individually released or metered portions is so determined.

European Patent Publication No. 0,145,839 describes a further apparatus for the apportioned or metered release of flowable masses. Herein, a container, circularly-shaped in cross section, is utilized, around which an additional circularly-shaped drum is rotatable adjacent to the outer surface of the container. This container has an approximately horizontal axis and has, on its lower portion, an exit opening for the masses. This exit opening includes an exchange or distribution piece which includes a slot-shaped opening that cooperates with the outer cylinder and which itself is fed or supplied with the mass via a large number of bores arranged in rows. When using differing viscosities, or during obstructions or breakdowns, the distribution piece cooperating with the cylinder can be exchanged, for example, for one having bores of a smaller diameter or for cleaning purposes.

Disadvantages of the known apparatuses are that adaption for differing viscosities can only be achieved with an increase effort and with extended down times of the apparatus. In addition, as is known, the viscosity of such masses is greatly dependent upon their temperature, wherein even if the masses enter into the apportioning apparatus at a very exact predetermined temperature, it is, in part, difficult to control the cooling within the apparatus.

The known substance distributors or drum members are constructed so that high additions of heat can, due to geometric reasons, be added only with difficulty. Too high a temperature, such as for example of heat exchange media, must be avoided since, as is known, the substances to be apportioned, have low heat conductivities whereby, on one hand a high temperature gradient is caused within the flowing stream of substances while, on the other hand, in the immediate heat transfer areas decomposition of the substances to be apportioned can occur.

SUMMARY OF THE INVENTION

An objective of the present invention is the avoidance of the previously noted disadvantages and achieves a simple apparatus that is simply operable and in which substances of differing viscosities can be processed and in which the amounts or sizes of the individual portions or doses can also be simply determined, with the instant invention proceedings from the state of the art as exemplified, for example, in noted European Patent Publication No. 0,145,389 and European Patent Publication No. 0,511,187.

The apparatus of this invention sets forth an apparatus for the apportioned release or metered dosing of flowable substances or masses including, in particular, a stationary distributor for these substances having, in cross section, at least a round outer region, an endless sleeve having a circular cross section and a substantially horizontal axis and a plurality of continuous openings for the passage of the substances, with the sleeve being movable relative to the distributor, the distributor having a distribution channel fed by the substances, the distribution channel preferably having a substantially constant cross section which extends transversely to the direction of movement of the distributor and preferably extends parallel to the generatrix of the sleeve, the distribution channel being connected, via at least one inlet having a plurality of bores, with an outwardly open recess, the recess extending transversely to the direction of movement of the sleeve in the round outer region of the distributor, with the substances being deposited, in portions, via the recess, downwardly through the plurality of openings, upon means for transporting, particularly an endless steel belt wherein, within and along the distribution channel, a distribution conduit is arranged, with the distribution conduit including an exit remote from the recess, with a flow of the substances occurring through the exit transversely to the distribution conduit.

By the use of a stationary distributor having a sleeve, with continuous bores moveable relative thereto, the substance stream can be interrupted in a particularly simple way. Here it is an advantage that the apparatus is arranged substantially horizontally since no adaption of differing ways or movements of the substances to their deposition on transporting means is required. Since the cross section of the channel remains substantially constant, this not only eases the manufacture of the apparatus but also eases flow resistance requirements since the dimensioning of the distribution channel can normally be so chosen that no large pressure differentials occur. By having the distribution conduit located within the distribution channels permits that the distribution channel, which as a rule is a portion of the distributor, also, for example, has a cylindrical milled out or machined area in the longitudinal direction, so that the distribution conduit can be uniformly fed or supplied with the substances along its longitudinal extent. The exit of the substances is kept at a distance from the input to the recess so that a flow transverse to the distribution conduit takes place to avoid that the substances flow directly from the distribution conduit into the inlets thus permitting pressure equalization to occur via the transverse flows.

When the exit in the distribution conduit takes the form of a plurality of opening, particularly bores, there is the advantage that the distribution conduit, even at high pressures within the substances being conveyed therein, can empty uniformly into the distribution channel independently of the pressure up to predetermined flow parameters.

When the distribution conduit, starting at the entrance of the substances thereinto, utilizes a decreasing flow cross section, the requirements for the transporting of the substances, within the distribution conduit, can, even at differing pressure conditions depending upon the viscosity of the substances to be dosed or apportioned, be readily accomplished so that a uniform pressure distribution of the substances within the distribution channel can be accomplished even with hard to process substances.

When the distribution conduit includes a lengthwise extending, preferably vertically oriented slot, a simple optimization of the flow can be achieved within the flow within the distribution conduit, wherein at the same time a particularly simple mechanical construction is achieved. This slot can, for example, have a continuously-reducing cross section via the use of a wedge surface so that the cross section is matched to the amount of the exiting substances.

When slot includes an insert, which in turn includes a substantially vertical passage having a plurality of cross passages, this causes a reducing flow cross section starting at the entrance of the substances, wherein the cross channels preferably form channels inclined in the flow direction which merge into the openings of the exit, so as to produce an embodiment which particularly suited for low viscosity materials. At the same time, a possibility for the adaption for differing flow parameters is also achieved which can be put into use very simply.

When the flow resistance within the distribution channel is normal relative to the distribution conduit and to the inlet and thus substantially similar therewithin, the inlets are supplied with equal mass streams, from both sides, whereby the entering mass streams will also have the same temperature so that no differing viscosities or differing input speeds of the masses in the inlets cause undesired overlap or stratifications within the mass streams. When flow baffle plates are arranged in the space between the distribution channel and the distribution conduit, particularly when arranged parallel with the distribution conduits, individual chambers are formed which permit pressure equalization of the flowing masses transversely to the axial extent of the distributor.

When the distribution conduit is axially arranged within the distribution channel, particularly symmetric flow conditions are achieved wherein, at the same time, identical temperature distributions and heat transmissions can be maintained.

When the flow baffle plates are connected with the distribution conduit and preferably formed of one piece, an especially simple exchange or removal of the baffle plates together with the distribution conduit can be made, wherein due to this one piece construction the resulting cleaning operations can be simplified through the avoidance of apertures or slits.

When the distribution conduit is shaped as a tube having circular or graduated circle inner and outer contours with an identical center, this conduit can be easily fabricated, whereby for example, via wall thickness variations, desired changes in flow cross section can be produced simply and exactly.

When the flow baffle plates abut the inner wall of the distribution channel and include a plurality of passage openings, particularly passage channels, that border the inner wall of the distribution channel, the determination of the pressure and flow can easily made via these openings or canals and permit a plurality of accommodation possibilities.

When the flow baffle plates, in cross section, are formed as rounded, particularly as partially circular additional recesses that extend parallel to each other, these can be formed particularly simply and exactly, thereby achieving, at the same time, particularly advantageous flow conditions without having only a few partially through-flow zones.

When the exit from the distribution conduit is arranged particularly vertically above the inlet, the exit of the individual mass portions which extend substantially vertically downwardly, is easily achieved.

When, in the recess of the distributor, at least one seal element is arranged opposing the sleeve, sealing need not occur along the entire rounding but only along the sealing element so that a higher contact pressure between the seal element and the sleeve, and thus a higher sealing force, can be achieved.

When the least one sealing element adjoins a curvilinear, particularly partially cylindrical, area of the sleeve, the lowest possible deformation, during sealing, relative to the sleeve is achieved or there is total absence of deformation forces at the sleeve while still achieving high sealability.

When a first sealing element in the recess, when viewed in the direction of movement of the sleeve, preferably takes the form of a vertically arranged packing strip, it is a sealing element that can be simply produced, and which, for example, readily solves the exit of masses along the generatrix of the sleeve. Due to the vertical arrangement of the packing strips, on both sides of the inlets of the masses, these strips introduce an orientation in the flow direction, particularly when, via a portion of the sealing strips, a boundary edge for the flow area of the mass is achieved.

When the inlet occurs from two sides, relative to the direction of movement of the sleeve, and sealed, via seal elements, against the sleeve, a particularly high service life of the distributor is assured, wherein, at the same time, via a simple replacement of the seal elements, an especially good seal, for sealing relative to the sleeve, is attainable.

When at least one, and preferably two, sealing elements are resiliently biased against the sleeve, the wear of the inner surface of the sleeve can be minimized and it is further assured that even with differing curvilinear shapes of the interior of the sleeve, full sealing can be assured independent of the shape of the roundness of the interior of the distributor.

When the recess for the mass has a variable width, relative to the sleeve, further possibilities exist to regulate the amount of the mass that is to be positioned or deposited on the transport mechanism. Only the slit must be reduced when a smaller amount is to be deposited and conversely, only the slit must be increased. This additional variation possibility is of particular importance since here the amount of the mass to be apportioned or metered can also be controlled in further areas, even with differing viscosities.

When at least one seal element takes the form of a leaf spring which is approximately tangentially arranged relative to the rounded region of the distributor, the room or space needed in the distributor for the sealing elements can be especially small so that, for example, additional heating means, such as heating channels or other additional fixtures, can be easily added to the distributor.

When one sealing element includes an area that extends transversely to the inlet it serves to reorient the mass exiting from the inlet prior to its exit through the sleeve, so that unintended preferred flow paths can be avoided so that, for example, inlets, which would cover opening in the sleeve, as it moves past, do not lead to the preferred release of the mass.

When the sealing elements consist of material that is softer than that of the sleeve, it can be assured that wear occurs at the sealing element and not on the inside of the sleeve which is particularly difficult to service. This is of particular importance when it cannot be assured that impurities in the mass to be apportioned, such as sand grains, or the like, can be avoided so that the resulting grooves do not occur in the sleeve but rather in the seal elements.

When the distributor, when viewed in the direction of movement of the sleeve, includes removable guide shoes that are located before and after the recess and which cooperate with said sleeve, then a material pairing or selection of that of the sleeve and the guide shoes can be chosen and it is not necessary that the material composition of the distributor be accommodated to that of the sleeve, so that, for example, the desired heat conductivity, ease of material working or the like can be fully considered when the material for the distributor is chosen without having to consider any material compatibility between the distributor and the sleeve.

When the distribution conduit includes its own temperature control device, particularly heating, particularly exact temperature control of the mass to be apportioned can be achieved whereby, at the same time, excessive temperature demands can be avoided.

When the recess is bounded, in a length-wise direction, with end pieces that cooperate with the sealing elements, a particularly efficient seal of the distributor, relative to the sleeve, is assured. Thus, the sealing elements and the end pieces can at least be connected. In addition, the possibility exists to spring bias the end pieces against the sleeve.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS

Figure 1:
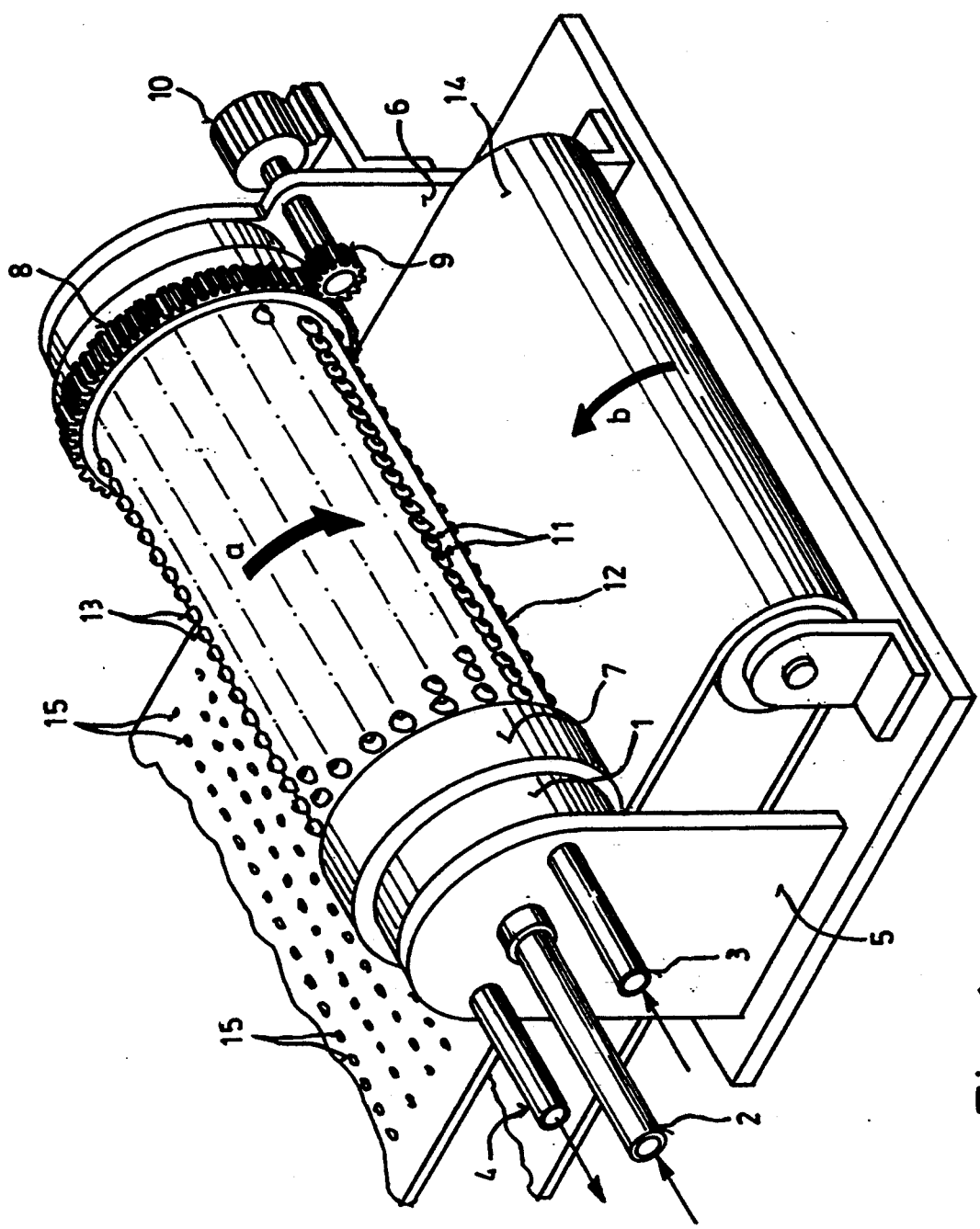
FIG. 1 is a perspective view of an apparatus for apportioning or metered dosing of substances having a cylindrical distributor, a cylindrical jacket or sleeve and an endless steel belt.

The apparatus for the apportioned release or metered dosing of flowable or fluent substances or masses shown in FIG. 1 includes a stationary cylindrical substance or mass distributor or drum member 1, with the input of the substances occurring via conduit 2, with conduit 2 extending into a distribution conduit that is not shown in FIG. 1. In addition, temperature control of the distributor is achieved via circulating heating oil which enters the distributor via inlet conduit 3 and exits via conduit 4. Distributor 1 is stationary and has its end faces affixed at mounting supports 5 and 6, with distributor 1 being arranged so that its major axis is horizontal. A cylindrical sleeve or jacket 7 is provided with a toothed rim 8 which can be turned in the direction of arrow a via a gear wheel 9 driven by an electric motor 10.

Sleeve 7 includes a plurality of openings 11 which extend along generatrix 12 of sleeve 7 wherein each opening leads into truncated cone 13. Via the use of this truncated cone, or truncated pyramid or the like, on one hand, post-dripping substances can be distributed over a large area of the sleeve. On the other hand, with a thin-walled sleeve, larger substance portions can be transported in the rotational direction of the cylinder, so that higher throughputs can be achieved during the deposition of the substances without filament formation or the like in the transport mechanism arranged thereunder, which in this case takes the form of an endless steel belt 14. Steel belt 14 moves in the direction of arrow b whereby the speeds, that is, between the rotational speed of the tips of the truncated cone and the rotational speed of the belt, depending on the desired form of substance portion that are deposited on steel band 14, can be regulated. For example, if an elongated form of substance portions 15 is desired on steel belt 14, there must be a difference between the two speeds, so that either an advance or a lag of the flowable substances can be achieved at the steel band. Depending upon whether the flowable substances, deposited on the steel band are thixotropic, thermoplastic or hardened by heat, a subsequent treatment can take place with a cooling apparatus, for example via spray nozzles arranged underneath the belt or via a heating apparatus, for example an infrared emitter arranged above the belt.

The flow of the material or substance is such that it arrives within the distributor via conduit 2 and thereafter exits through bores 11 in sleeve 7 either along a slot extending in the direction of generatrix 12 of sleeve 7 or via a plurality of bores which also extend along a generatrix. The interruption of the mass or substance stream occurs when a closed area of the sleeve arrives underneath the opening of the distributor.

Figure 2:
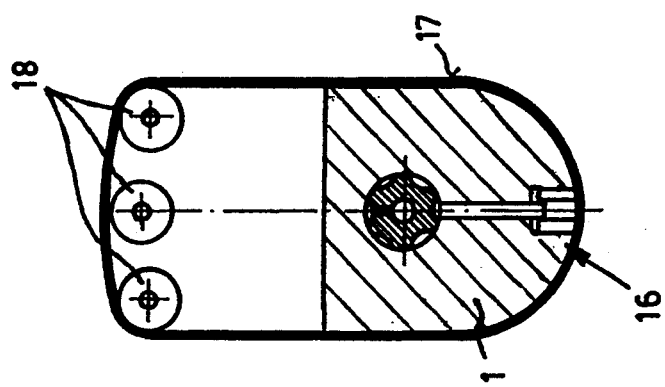
FIG. 2 is a schematic representation of a partially distributor that utilizes an endless belt as a sleeve.

As shown in FIG. 2, it is not required that the distributor and the sleeve are fully cylindrical, but it is sufficient as long as distributor 1 includes a rounded region or portion 16, around which a further endless sleeve 17 is movable, with sleeve 17 being driven and redirected in an upper region via three rollers 18. Endless sleeve 17 includes non-illustrated openings through which the substances are introduced into the distributor can emerge therefrom.

Figure 3:
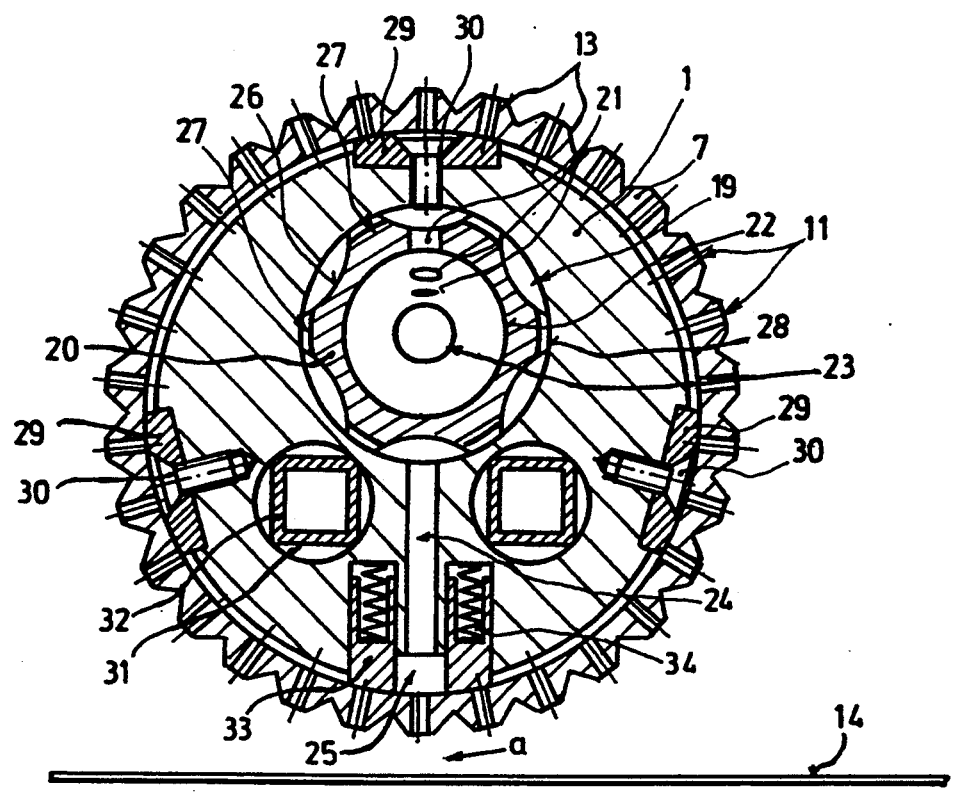
FIG. 3 is a cross section of both a cylindrical distributor and a cylindrical sleeve.

FIG. 3 illustrates, in section, both distributor 1 and sleeve 7. As is especially clearly shown in FIG. 1, steel band or belt 14 is positioned directly underneath distributor 1, with sleeve 7 including truncated cones 13 into which bores 11 terminate. Distributor 1 includes a distribution channel 19 which in turn has a distribution conduit 20 arranged therein. Distribution conduit 20 is, as seen in FIG. 1, connected, via conduit 2, with a non-illustrated mass or substance container.

The mass or substance arrives in the distributor at a predetermined inlet pressure wherein this inlet pressure is also contributorily determined by the viscosity of the substance. The exit or discharge of the substances form distribution conduit 20 is achieved via a plurality of openings 21 from the interior of distribution conduit 20, which has a continually decreasing flow cross section, that is reproduced in the circular area between an outer circle 22 and an inner circle 23. Openings 21 are located vertically above inlets 24 which connect distribution channel 19 with recess 25. Inlets 24 are comprised of a large number of bores that can have a larger flow cross section and are parallel with generatrix 12 of sleeve 7.

Figure 4:
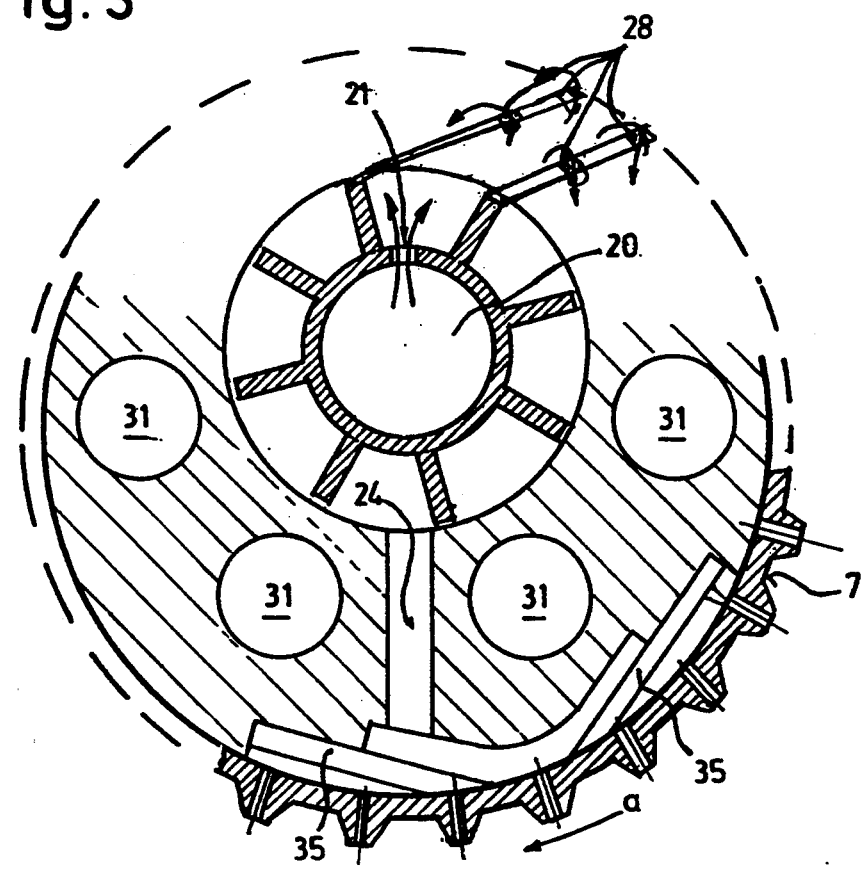
FIG. 4 is an additional cross section of a cylindrical distributor and a cylindrical sleeve, with a distribution conduit being partially shown in perspective.

Distribution conduit 20 is comprised of a pipe or tube which is arranged or located within distribution channel 19 and which has an almost identical circular shaped cross section. The flow cross section of the internal diameter is continually decreased whereas, the outer diameter remains constant. The walls of the distribution conduit are machined so as to have six partially cylindrical, parallel-extending recesses 26, thereby forming baffle plates 27. These baffle plates include recesses, spaced relative to each other, thereby forming passage or through-put channels 28, which on the other side are bounded by the inner wall of distribution channel 19. Throughput channels 28 are, as best seen in FIG. 4, arranged along distribution channel 19.

The flow of the mass or substance occurs hereby from the interior of distribution conduit 20 via openings 21 into additional recesses 26. In each of these additional recesses 26 pressure equalization is achieved so that the mass, from one recess to another recess, has a substantially identical pressure and can thereby exit with identical speed. Flow of the mass occurs in the interior of distribution conduit 20 along the distribution conduit and also transversely thereto as well as via throughput channels 28. It is particularly advantageous that these transverse flows via throughput channels 28 and recesses 26 be identical since as a result thereof a uniform input flow enters into inlets 24.

Substance distributor 1 also includes bronze guide shoes 29 that are attached thereto with bolts 30, with guide shoes 29 having a lower friction resistance than steel sleeve 7.

Within distributor 1 adjacent to inlets 24, heat conduction channels 31, which are filled with thermal conductivity media, are utilized. In contradistinction with the embodiment shown in FIG. 1, the heat transfer media in heat conduction channel 31 enters and exits, wherein, in the interior thereof, a pipe 32, capable of carrying the same volume is arranged, in which depending upon whether heating or cooling is required, thermal conductivity medium is either withdrawn or added.

Within recess 25, two seal elements and two seal packing strips 33, both of bronze, are biased against sleeve 7 via springs 34.

In the embodiment shown in FIG. 4, the seal elements take the form of leaf springs 35 that are biased against sleeve 7. This construction provides a particularly large usable space within the distributor thus permitting the use of not only two but a greater number of heat conduction channels 31. As can also be seen in FIG. 4, inlets 24 can empty or release not only directly vertically therebelow onto a transport mechanism, but also enable the exit of the flowable substances prior thereto.

Figure 5:
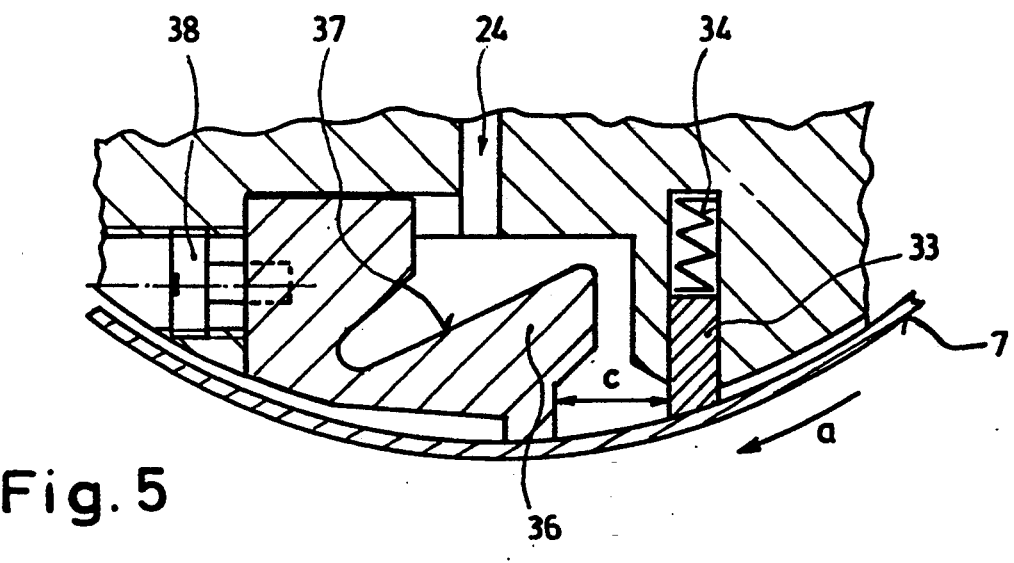
FIG. 5 is a section of a special construction of sealing elements.

As can be seen in FIG. 5, one of seal elements 36 can have an area 37 which runs or extends transversely to inlets 24 thereby causing a redirection of the flowable mass. Adjusting screw 38 can be used to vary the width of exit slit or aperture c so that the time span, during which an exit opening of the sleeve is fed by the flowable mass, is adjustable.

Figure 6:
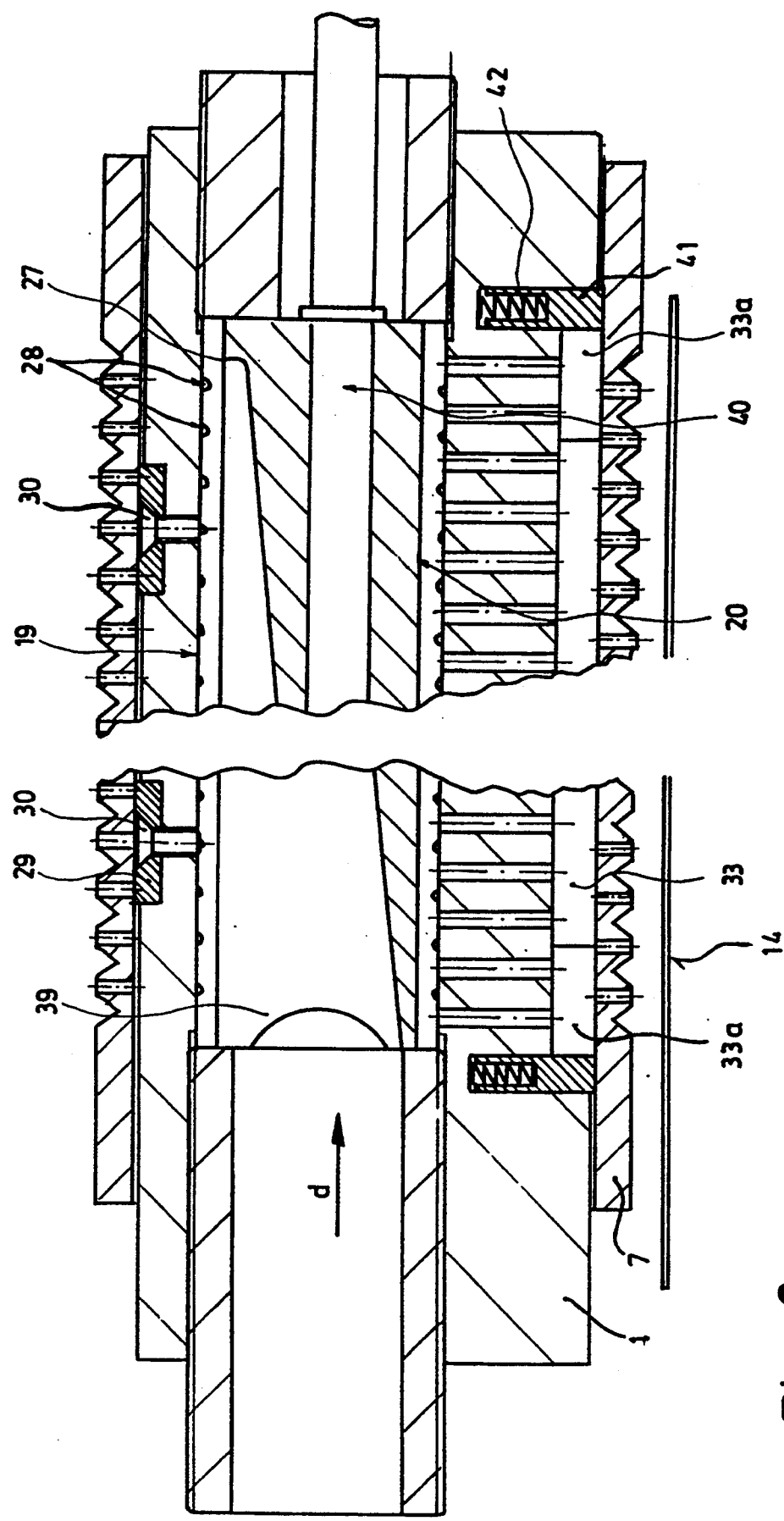
FIG. 6 is a broken axial section of one embodiment of the distributor of the apparatus of this invention, showing a slot within the distributor.

As can readily be seen in the longitudinal section, in FIG. 6, of distributor 1 and sleeve 7, guide shoes 29, attached via bolts 30, are also utilized at the peak or apex of the distributor wherein the number utilized depends on the width of the distributor. Within the distributor and in distribution channel 19, a distributor conduit 20, having a slot 39, is arranged. Slot 39 is vertically arranged and receives, in the direction d of movement of the mass, the volume of the mass that emerges from the conduit. In addition, distribution conduit 20 is provided with its own heating means or element 40. Packing strips 33 cooperate in their end portions 33a with end pieces 41 which in turn limit or bound recess 25, with end pieces 41 being held against sleeve 7 by springs 42. As can readily be seen in FIG. 6, packing strip 33 is divided along its longitudinal direction, into three pieces, wherein each end portion 33a cooperates with each end piece 41, with each end portion being specifically of unitary construction so that it has a U-shaped portion in cross section, which adjoins a U-shaped area of sleeve 7.

Figure 8:
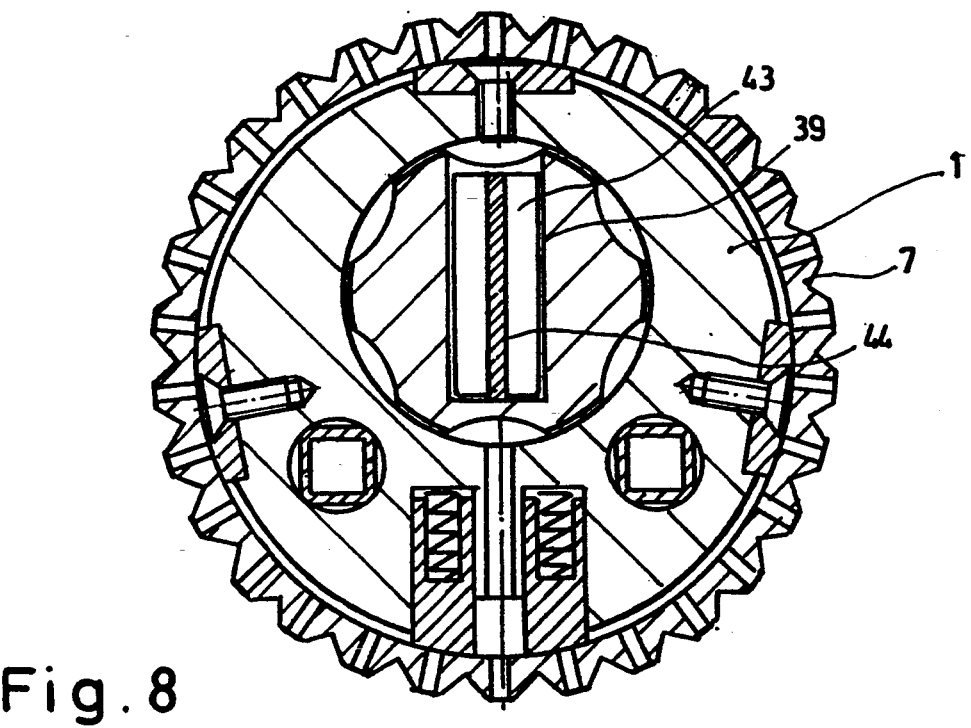
FIG. 8 is a cross section of the apparatus of FIG. 7 taken along line VIII—VIII.
Figure 7:
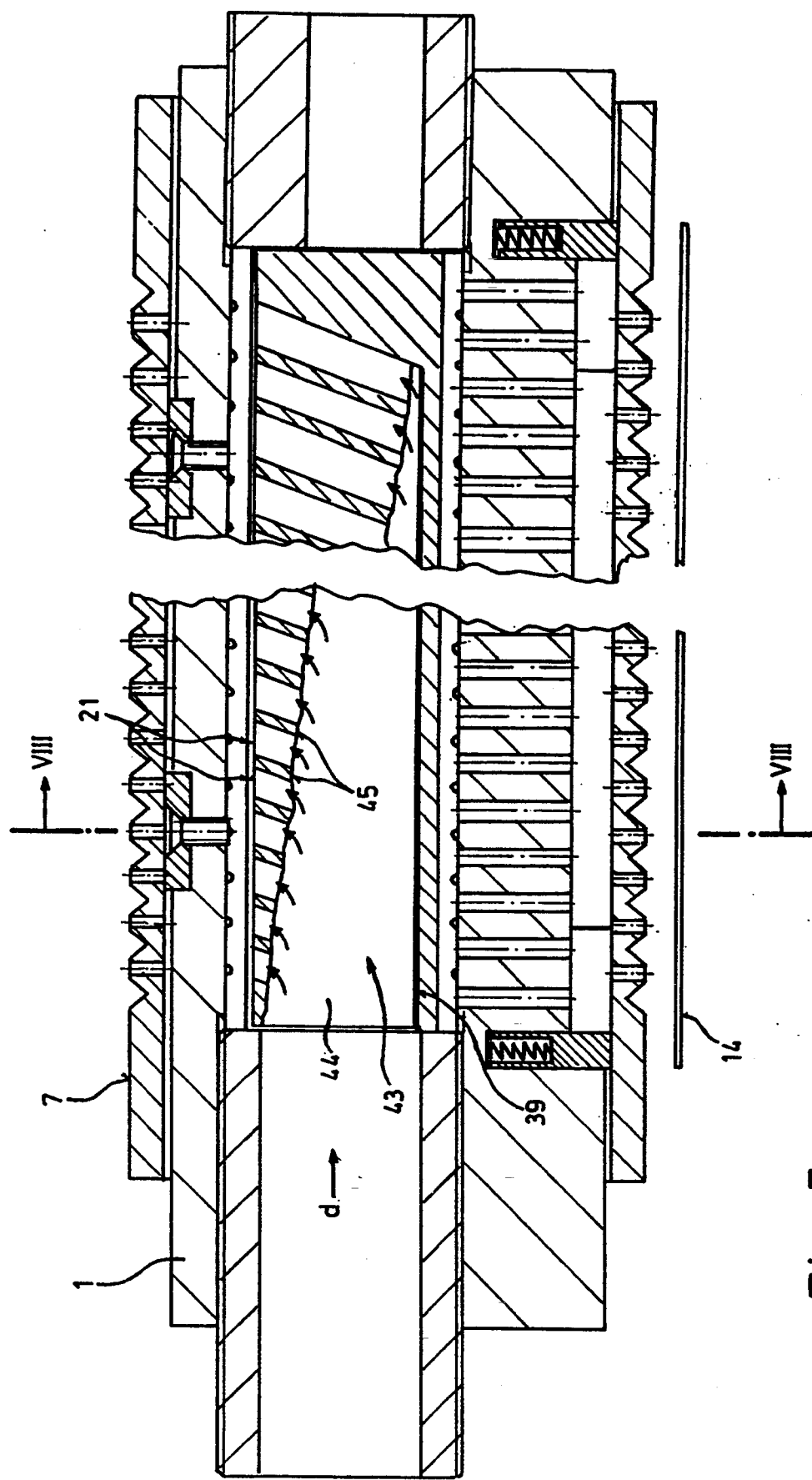
FIG. 7 is a broken axial section of another embodiment of the distributor of the apparatus of this invention, showing a slot within the distributor.

In the embodiment shown in FIGS. 7 and 8, slot 39 is also vertically arranged and has the same rectangular cross section. Slot 39 is designed to receive an insert 43 that has a passage 44 which is also vertically oriented and which in turn has cross passages 45. As can clearly be seen in FIG. 7, the open flow cross section of this slot is reduced in the direction of flow d of the mass. The exit from the distribution conduit is formed by a plurality of openings in which channels, formed by cross channels 45, terminate, with these channels being inclined in the flow direction.

While there are shown and described present preferred embodiments of the invention, it is to be distinctly understood that the invention is not limited thereto, but may be otherwise variously embodied and practiced within the scope of the following claims and the reasonably equivalent structures thereto.

What is claimed is:

1. Apparatus for the apportioned release of flowable substances comprising:

an endless sleeve and a distributor for said substances, said distributor comprising, a cross section, a circular outer region, said sleeve having a predetermined cross section, a circular inner region and a substantially horizontal axis and a plurality of continuous openings for the passage of said substances, said sleeve and distributor being movable relative to each other, said distributor having a distribution channel for said substances, said distribution channel extending transversely to a direction of movement of said distributor and said sleeve relative to each other, said distribution channel being connected, via at least one inlet having a plurality of bores with an outwardly open recess, said recess extending transversely to the direction of movement of said distributor and said sleeve relative to each other, said substances being deposited, in portions, via said recess, downwardly through said plurality of openings, upon means for transporting, within and along said distribution channel, a distribution conduit is arranged, said distribution conduit to which said substances are fed including an exit for said substances remote from said recess, with a flow of said substances occurring through said exit transversely to said distribution conduit.

2. The apparatus of claim 1, wherein said distributor is stationary.

3. The apparatus of claim 1, wherein said distribution channel extends parallel to the generatrix of said sleeve.

4. The apparatus of claim 1, wherein said distributor has a circular cross section.

5. The apparatus of claim 1, wherein said sleeve has a circular cross section.

6. The apparatus of claim 4, wherein said sleeve has a circular cross section.

7. The apparatus of claim 1, wherein the exit for said distribution conduit takes the form of a plurality of openings in said distribution conduit.

8. The apparatus of claim 1, wherein the interior of said distribution conduit includes a flow cross section, said flow cross section decreasing, starting at an entrance of said substances into said distribution conduit.

9. The apparatus of claim 8, wherein said flow longitudinal section is conical.

10. The apparatus of claim 1, wherein said distribution conduit includes a lengthwise extending vertically oriented slot adapted to receive the flow of said substances emerging from the conduit.

11. The apparatus of claim 10, wherein said slot includes an insert, said insert in turn including a vertically oriented passage having a plurality of cross passages, said passage causing a reduction in the flow cross section starting at an entrance of said substances.

12. The apparatus of claim 1, including a flow resistance within said distribution channel, said flow resistance acting in a lateral direction relative to said distribution conduit for said inlet so that said flow resistance is substantially similar therewithin.

13. The apparatus of claim 1, wherein flow baffle plates are arranged in the space between said distribution channel and said distribution conduit, said flow baffle plates being arranged parallel to said distribution conduit.

14. The apparatus of claim 1, wherein said distribution conduit is axially arranged within said distribution channel.

15. The apparatus of claim 13, wherein said flow baffle plates, which are connected with said distribution conduit, are formed of one piece.

16. The apparatus of claim 1, wherein said distribution conduit is shaped as a tube having circular inner and outer contours with an identical center.

17. The apparatus of claim 13, wherein said distribution channel includes an inner wall, said flow baffle plates abut the inner wall of said distribution channel and include a plurality of passage channels that border the inner wall of said distribution channel.

18. The apparatus of claim 13, wherein said flow baffle plates, in cross-section, include additional graduated circle recesses extending parallel to each other.

19. The apparatus of claim 1, wherein the exit from said distribution conduit is arranged vertically above said inlets.

20. The apparatus of claim 1, wherein at least one seal element is arranged within the recess of said distributor, opposing said sleeve.

21. The apparatus of claim 20, wherein said at least one seal element adjoins a curvelinear, partially cylindrical area of said sleeve.

22. The apparatus of claim 20, wherein a first seal element in said recess, when viewed in a direction of movement of said sleeve, takes the form of a vertically arranged packing strip.

23. The apparatus of claim 20, wherein said inlet, on both sides, relative to a direction of movement of said sleeve, is sealed, via sealing elements, relative to said sleeve.

24. The apparatus of claim 20, wherein at least one sealing element is resiliently biased against said sleeve.

25. The apparatus of claim 20, wherein said at least one sealing element comprises at least two sealing elements.

26. The apparatus of claim 1, wherein said recesses have a variable width discharge gap, relative to said sleeve, for said substances.

27. The apparatus of claim 20, wherein at least one seal element takes the form of a leaf spring which is approximately tangential to the round outer region of said distributor.

28. The apparatus of claim 20, wherein one of said sealing elements includes an area that extends transversely to said inlet, said area serving to reorient said substance exiting from said inlet prior to its exit through said sleeve.

29. The apparatus of claim 20, wherein the sealing elements consists of a material that is softer than the material of said sleeve.

30. The apparatus of claim 20, wherein said recess, is bounded, in a length-wise direction, with end pieces, said end pieces cooperating with at least one of said sealing elements.

31. The apparatus of claim 1, wherein said distributor, when viewed in a direction of movement of said sleeve, includes removable guide shoes located before and after said recess, said guide shoes being adapted to cooperate with said sleeve.

32. The apparatus of claim 1, wherein said distribution conduit includes means for heating for temperature control.

33. The apparatus of claim 1, wherein said predetermined distributor cross section is substantially constant.

34. The apparatus of claim 1, wherein said predetermined distributor cross section is circular.

35. The apparatus of claim 1, wherein said predetermined distributor cross section is that of a graduated circle.

36. The apparatus of claim 1, wherein said means for transportation is an endless steel belt.

37. An apparatus for the metered dosing of fluent material masses comprising:

a distributor for said metered masses having, in cross section, at least a rounded outer region;

an endless sleeve, said sleeve having a circular cross section and a substantially horizontal axis and a plurality of continuous openings for the passage of said material masses, said sleeve being movable relative to said distributor;

said distributor having a distribution channel extending transversely to a direction of movement of said distributor and said sleeve and extending parallel to the generatrix of said sleeve;

said distributor channel being connected, via at least one inlet having a plurality of bores, with an outwardly open recess, said recess extending transversely to the direction of movement of said sleeve in said rounded outer region;

a transport device arranged beneath said distributor;

said material mass portions being deposited, in metered doses, via said recess, downwardly through said plurality of openings, upon said transport device; and a distribution conduit being arranged within and along said distribution channel, said distribution conduit to which said material masses are fed including an exit for said material masses remote from said recess, with a flow of said material masses occurring through said exit transversely to said distribution conduit.

38. The apparatus of claim 37, wherein both of said distributor and said sleeve have a substantially circular cross section.

* * * * *